United States Patent [19]

Arends et al.

[11] Patent Number: 4,779,031

[45] Date of Patent: Oct. 18, 1988

[54] MOTOR SYSTEM

[75] Inventors: Gregory E. Arends, Libertyville; James R. Polzin, Wheaton, both of Ill.

[73] Assignee: Intellico, Inc., Libertyville, Ill.

[21] Appl. No.: 819,202

[22] Filed: Jan. 15, 1986

Related U.S. Application Data

[63] Continuation-in-part of Ser. No. 814,687, Dec. 30, 1985.

[51] Int. Cl.$^4$ .............................................. H02P 8/00
[52] U.S. Cl. .................................... 318/565; 318/685; 318/434; 318/334; 318/696; 310/68 R; 310/58; 310/62
[58] Field of Search ............... 318/138, 254, 696, 685, 318/563, 565, 334, 439, 345 E; 361/20, 21, 22, 23, 24, 25, 26, 27, 28, 29, 401, 395, 396, 397, 398, 399, 393, 394; 310/16, 17, 19, 51, 68 C, 88, 89, 68 R, 68 D, 52, 62, 63, 227, 67 R, 156, 194, 64, 58, 50, 54, DIG. 6

[56] References Cited

U.S. PATENT DOCUMENTS

| | | | |
|---|---|---|---|
| 3,229,130 | 1/1966 | Drouard | 310/54 |
| 3,277,346 | 10/1966 | McAdam et al. | 361/393 X |
| 3,386,019 | 5/1968 | Hill | 318/254 X |
| 3,531,702 | 9/1970 | Hill | 318/138 |
| 3,538,361 | 11/1970 | Hilterbrick et al. | 310/58 X |
| 3,569,804 | 3/1971 | Studer | 318/138 |
| 3,707,638 | 12/1972 | Nailen | 318/138 X |
| 3,809,935 | 5/1974 | Kristen et al. | 310/68 R |
| 4,072,888 | 2/1978 | Bechtle et al. | 318/685 |
| 4,097,790 | 6/1978 | Wilson | 318/334 X |
| 4,134,055 | 1/1979 | Akamatsu | 318/696 |
| 4,191,245 | 3/1980 | Wendt et al. | 310/62 X |
| 4,205,246 | 5/1980 | Wise et al. | 310/68 C |
| 4,259,603 | 3/1981 | Uchiyama et al. | 310/67 R X |
| 4,266,152 | 5/1981 | Herr et al. | 310/62 X |
| 4,317,176 | 2/1982 | Saar et al. | 318/434 X |
| 4,329,636 | 5/1982 | Uchida et al. | 310/68 R X |
| 4,409,530 | 10/1983 | Neeper et al. | 318/685 |
| 4,482,847 | 11/1984 | Rudich, Jr. et al. | |
| 4,547,826 | 10/1985 | Premerlani | 361/27 X |
| 4,550,277 | 10/1985 | Carney | 318/434 X |
| 4,554,473 | 11/1985 | Muller | 310/67 R |
| 4,558,245 | 12/1985 | Glasauer et al. | 310/DIG. 6 X |
| 4,574,226 | 3/1986 | Binder | 318/334 X |
| 4,591,774 | 5/1986 | Ferris et al. | 318/685 X |

FOREIGN PATENT DOCUMENTS

| | | | |
|---|---|---|---|
| 0063549 | 5/1980 | Japan | 310/52 |
| 0226648 | 12/1984 | Japan | 310/DIG. 6 |

OTHER PUBLICATIONS

RIFA Data Sheet PBA 3219, "Integrated Circuits," Oct., 1983.
Hurst, "Stepping Motor Controller" brochure.
Semix Rorze document.
Compumotor Corporation DH Series Indexer Drive brochure.
Interloop Model #200 catalog sheet.
Advanced Micro Systems, Inc. SM-2 brochure.
Fasco Type 04 catalog sheet.

(List continued on next page.)

Primary Examiner—William M. Shoop, Jr.
Assistant Examiner—Paul Ip
Attorney, Agent, or Firm—George H. Gerstman

[57] ABSTRACT

An electrical motor system is provided in which driver means position the motor, control the speed of the motor and control the current delivered to the windings of the motor. The operating parameters of the system are sensed on a moment by moment basis and data concerning these operating parameters is provided to a memory. A user has the ability to provide a plurality of user-stipulated operating parameters during use of the motor system. The user-stipulated operating parameters are sensed on a moment by moment basis and data concerning the user-stipulated operating parameters is provided to the memory. The memory contains limiting parameters, sensed operating parameters and user-stipulated operating parameters and a set of adaptive programs for determining the relationship between these parameters. The various parameters are fed to a computer which operates with them, via the adaptive programs, to create, on a moment by moment basis, a new set of operational limiting parameters.

9 Claims, 7 Drawing Sheets

OTHER PUBLICATIONS

Panasonic Industrial brushless DC fan motor publicity.
Product Design & Development sheet, "AC Motor Starting Switch".
Papst document.
Unitrode Corporation, Stepper Motor Drive Circuit brochure.
RIFA PBL 3717 brochure.
Sigma Instruments, Inc., PBD 3517 brochure.
Sigma Instruments, Inc., Model 29B brochure.
Sigma Instruments, Inc., Model 29A brochure.
Superior Electric, Catalog MMC781-4 (1984).
Superior Electric, Catalog MSX1084 (1984).
Slo-Syn DC stepping motors document.
Superior Electric, "Slo-Syn DC Stepping Motors" catalog (1979).
Compumotor Corporation 90-page catalog.

MOTOR SYSTEM

This application is a continuation-in-part of U.S. patent application Ser. No. 814,687, filed Dec. 30, 1985, and entitled "Stepper Motor System" in the names of Gregory E. Arends and James R. Polzin.

FIELD OF THE INVENTION

The present invention concerns a novel electrical motor system that is highly efficient and compact.

BACKGROUND OF THE INVENTION

In a conventional servo motor system, the driver circuitry and the indexer circuitry are in the form of printed circuit boards (PCB) with integrated circuits and other discrete components soldered to copper traces that are photochemically etched on the board. In addition, the driver and indexer circuitry in a high resolution servo motor positioning system is typically complex in comparison to the circuitry found in the simple speed controlled servo motor systems in which a tachometer is typically used to control the speed of the motor. In a PCB configuration, the driver in a servo motor system is typically large and bulky, thereby requiring a separate enclosure that is unattached to the motor and connected to the motor by a lengthy cable. An encoder, resolver or some other position/velocity sensor system is provided and is connected to the driver. The output supplied by the position/velocity sensor system allows the driver to control the position and velocity of the motor. Connected to the driver is an indexer which tells the driver how far, and at what speed, to advance the motor. In addition, a separate power supply is connected to the driver and indexer.

There are inherent disadvantages in a conventional servo motor system, however.

1. Size

Conventional driver circuits in a servo motor system are comparatively large. A high power, high speed, or fine resolution servo motor system is bulky and can not be reduced to a small enough size to be placed in a restrictive area, or attached directly to a motor. The addition of an indexer or external power supply significantly adds to the size of the system.

2. Weight

When populated with components and their heat sinks, the weight of the driver and indexer circuits in an appropriate enclosure can significantly reduce the benefits of using a conventional servo motor system in weight sensitive industries such as the aerospace and aviation industries.

3. Heat Dissipation

The substantial heat dissipation requirements of a conventional servo motor driver circuit prevent the driver from being mounted in restrictive areas or enclosures without ventilation. Conventional driver circuitry is complex and has many individual components populating a driver circuit, each having its own heat dissipation requirements. Because of the need to dissipate the heat of the individual components through the use of bulky heat sinks, a conventional driver circuit must be large by nature. Even with substantual heat sinking, a conventional driver can only be mounted in low temperature environments because of the relatively ineffective nature of a typical heat sinking system.

4. EMI/RF Emissions

Because of the large area on a PCB in which traces and components are exposed, a servo amplifier that utilizies high frequency, current switching techniques will emit EMI/RF that can damage or interfere with EMI/RF sensitive devices located near the PCB. Many industries, such as the health care and semiconductor manufacturing industries, cannot use conventional servo motor systems because of the EMI/RF noise they emit. In addition, as in the case of a driver located near an electrical motor, EMI/RF produced by the motor may damage or interfere with any exposed EMI/RF sensitive devises located on the driver, or indexer.

5. High-Frequency Performance

Because of variances in trace width, length and exposure, a PCB circuit is limited in its ability to handle high speed transmission of signals. As in the case when a motor makes positioning moves that are high in resolution, a driver with limited high speed signal transmission capabilities would restrict a motor's speed, as well as limit the resolution a motor could possibly achieve. (Example: 4,000 steps per revolution verses 50,000 steps per revolution.) An additional problem occurs when the motor is not in very close proximity with the high resolution driver. The greater the distance that the signal must travel to the motor, the lower the possible speed and resolution a motor can achieve.

6. Circuit Performance

The performance of a PCB driver circuit is limited by the tolerances of the discrete resistors, capacitors, inductors, and conductors used in the design, as well as the trace width, length, thickness and exposure variances on the PCB. The inability to fine tune the resistors, capacitors, inductors, conductors, and traces results in a circuit that is less efficient, less predictable, less reliable, less stable and with broad absolute specifications.

7. Fixed Operating Parameters

In conventional servo motor systems, the distance between the motor, driver and indexer makes it difficult to monitor small, but significant changes in the real time operating parameters, such as temperature and current, occuring in the motor system. The inability to monitor these parameters has resulted in the inability to safely optimize a motor's operating efficiency as determined by certain changes in its operating environment.

8. Assembly

Assembling a conventional servo motor system in a product is time consuming, requiring manual placement and wiring. Errors can frequently occur when placement and wiring is done manually. These errors will often damage the system, and in some cases can cause personal injury.

9. Environment

Conventional driver and indexer circuits are not hermetically sealed. Exposure to humid environments will damage the circuits. In flammable environments, a short in the circuit could cause an explosion.

10. Safety

Damage done to a PCB drive circuit as a result of a hostle environment, or severing the external connecting wires, or inadequate heat dissipation can result in life threatening safety hazards, such as electrocution.

11. Mechanical Stability

In a conventional servo motor system, the individual components on a driver circuit are not permanently potted in place, and may become loose as a result of vibration.

A conventional servo motor system is a closed loop system that requires an AC or DC motor, a driver, a position/velocity sensor system, such as an encoder or resolver (which monitors the position, speed, and direction of a move), or tachometer (which only monitors the speed of a move), and an indexer. The motor is actuated by the driver circuitry which contains a current control means, a preamplifier means, and a translating means. The indexer which is connected to the driver sends information to the translator. The information signals the desired characteristics of a specific move, such as the distance, speed, or direction of the move. In conventional systems, the information is sent to the driver in the form of a single move command. In some sophisticated systems, the information is sent to the driver in the form of a number of individual move pulses, whereby each pulse moves the motor a specific distance until the desired position is achieved. The translator then regulates the current control means by way of the preamplifier means, thereby controlling the flow of current into the windings of the motor. The position/velocity sensor system provides feedback to the driver which uses the feedback to control the motor in a manner that achieves the desired characteristics of the specific move. In some sophisticated configurations, the indexer also contains circuitry for communicating with outside controls, thereby allowing a computer to send variable move commands to the indexer.

In closed loop positioning applications, the position/velocity sensor is typically in the form of an optical encoder or resolver that is connected to the motor. The encoder or resolver provides feedback to the encoder or resolver interface circuitry, which translates the information to a means understandable by the translator means. The information can then be transmitted to the translator enabling the translator to control the flow of current into the windings of the motor in order to achieve the desired position, speed, and direction of a move.

There appears to be a trend to miniaturize. For example, in a prior art servo motor system manufactured by Copley Controls Corporation of Newton, Mass., a current control means is available in a standard dip package. Although the current control means is substantially larger than a standard intergrated circuit (IC) semiconductor, the current control means can be mounted along with other driver, indexer and encoder or resolver circuitry on a single printed circuit board. However, the Copley current control means maintains the limitations of a conventional servo motor system. For example, the size of the Copley unit remains relatively large and bulky, and must remain separated from the motor itself. The unit still requires relatively lengthy external wires between the driver means and motor. Faulty connections and wiring errors can still occur, possibly damaging the components in the circuit or causing electrocution. The unit still requires an external power supply, which must be manually wired to the unit. In addition, the unit and their associated wiring radiates electromagnetic interference that should be reduced, if possible. Finally, the unit and power supply still requires a relatively large amount of space, as well as the adaptability of the space to handle a significant amount of weight and heat dissipation.

Galil Motion Control, Incorporated of Mountain View, Calif., has developed an integrated circuit (IC) semiconductor that replaces portions of the translator and servo preamplifier in conventional servo motor systems. The IC, however, still requires additional driver circuitry, power supply, and position/velocity sensor, thereby maintaining many of the problems associated with a conventional servo motor system.

Some companies, such as Vernitron Control Components of San Diego, Calif., manufactures synchros, or transducers, which have accurate positioning capabilities. Synchros are primarily used in military applications, and are actually synchronous motor systems (or generators) which have been adapted to serve as variable transformers in the measurement of angular position. The actuator, actuating circuitry, and resolver are combined in a single unit. The actuating circuitry, which is in printed circuit board form, is potted in place. The unit, however, has many limiting features. For example, the unit is a low power unit that requires a large external power supply, which substantially adds to the total size and weight of the system. The unit is not designed to for use in positioning applications that require moderate to high levels of holding torque, such as 100 oz. in. to 1000 oz. in., that are typical in the robotic and automation industries. ( A synchro, or transducer, typically has a maximum no load holding torque of less than 20 oz. in.) The speed of the unit is generally less than 400 RPM which is substantually slow when compared with the speed of a conventional servo motor system. In addition, the positioning accuracy of the unit is low when compared with the positioning accuracy of a conventional servo motor system. These are only a few of the limting aspects of a synchro, or a transducer.

It is an object of the present invention to provide a novel motor drive system that alleviates many of the problems concomitant with the motor drive systems of the prior art.

A further object of the present invention is to provide a motor system that monitors the operating parameters of the motor system.

Another object of the present invention is to provide a servo motor system that is significantly reduced in size and weight from the servo motor systems of the prior art.

A further object of the present invention is to provide a servo motor system that has less heat generated than the heat generation of prior art servo motor systems.

A still further object of the present invention is to provide a servo motor system that enables significantly reduced EMI/RF emissions.

Another object of the present invention is to provide a servo motor system in which assembly and connecting operations of the components are relatively easy to perform.

A further object of the present invention is to provide a servo motor system that is compact in size and is effectively mounted within a small space.

Another object of the present invention is to provide a servo motor system that is relatively simple in construction and easy to manufacture.

A still further object of the present invention is to provide a servo motor system that has significant mechanical stability.

Another object of the present invention is to provide a servo motor system that dissipates heat more efficiently than the prior art.

A further object of the present invention is to provide a drive package that can be easily adapted to servo motors of various shapes and sizes.

A still further object of the present invention is to provide a motor, drive circuit, control circuit, and position/velocity sensor in a unitary device.

Other objects and advantages of the present invention will become apparent as the description proceeds.

SUMMARY OF THE INVENTION

In accordance with one embodiment of the present invention, an electrical motor system is provided. The system includes a motor and driver means for actuating the motor. Means are provided for monitoring real time operating parameters of the motor. Monitoring means includes storage means containing a program which determines limiting parameters of the motor.

Means are provided for sensing preselected operating parameters of the motor. The monitoring means include means for comparing the sensed operating parameters with the limiting parameters and means responsive to the comparing means for controlling the driver means to maintain the real time parameters in a predetermined range governed by the limiting parameters.

In the illustrative embodiment, the preselected operating parameters include temperature and current, and the limiting parameters include maximum temperature and maximum current. Means are provided for operating the monitoring means on a moment to moment basis whereby substantially optimum power may be provided to the motor from moment to moment in accordance with the changing motor power needs.

In the illustrative embodiment, position/velocity sensing means are provided for sensing the position and velocity of the motor and for providing an output signal in response to the position and velocity of the motor. Means are provided for transmitting the output signal from the position/velocity sensing means to the monitoring means. The monitoring means includes means for providing a position and velocity signal from the monitoring means to the driver means, to enable the driver means to control the position and velocity of the motor.

In the illustrative embodiment, a common housing is provided for the driver means, monitoring means, and position/velocity sensing means with the housing including a metallic enclosure that is shielded against electrical noise. The housing is directly coupled to the back of the motor to form a compact, unitary device.

In the illustrative embodiment, the driver means and the monitoring means are hybridized on at least one hybrid circuit. The hybrid circuit includes power supply means to operate the servo motor system from direct line voltage. The hybrid circuit comprises a substrate, a metallization layer forming thick film and thin film electrical components, and monolithic semiconductor devices, other hybridized devices, and discrete components connected to the substrate. The hybrid circuit is potted in a thermally conductive compound, and a metal heat sink communicates with the compound to increase the dissipate heat capabilities of the hybrid circuit.

In the illustrative embodiment, a plurality of spaced current control devices are positioned along the heat sink in a heat conductive relationship therewith and are connected to the hybrid circuit.

A more detailed explanation of the invention is provided in the following description and claims, and is illustrated in the accompanying drawings.

DETAILED DESCRIPTION OF THE ILLUSTRATIVE EMBODIMENT

Figure 1A:
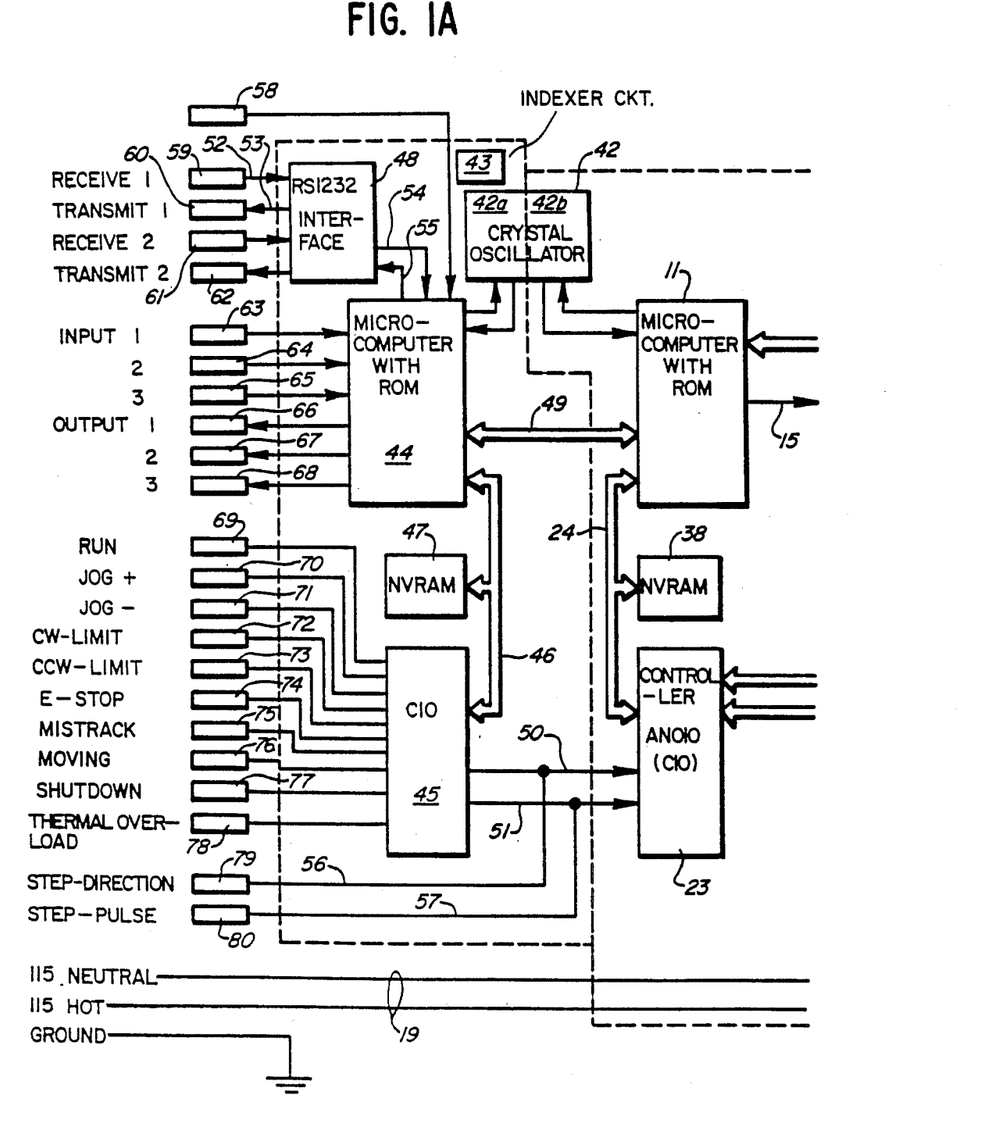
FIGS. 1A–1B, when connected together, comprise a schematic block diagram of a servo motor system constructed in accordance with the principles of the present invention.
Figure 1B:
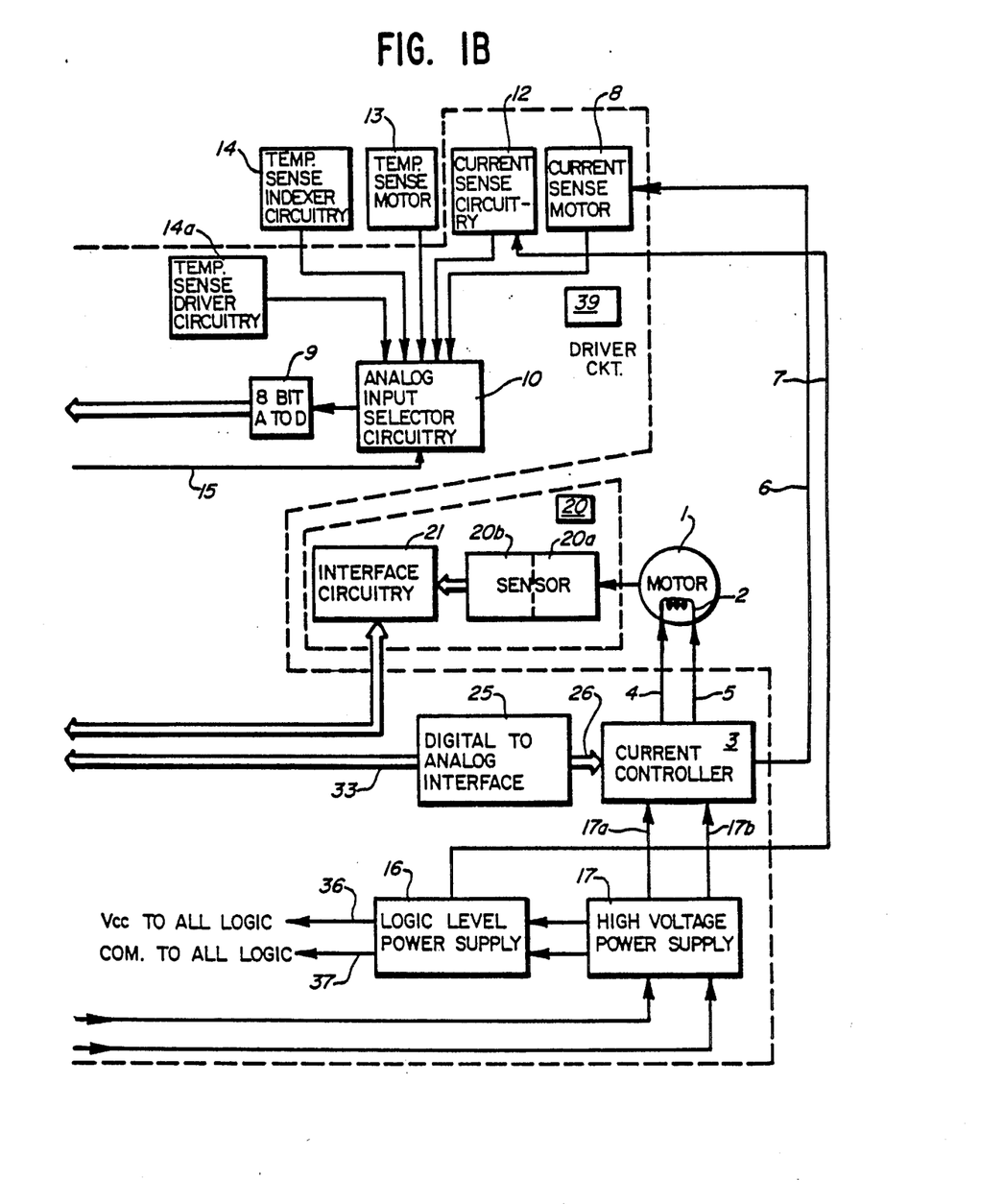

Referring to FIGS. 1A–1B, there is shown therein a motor 1 having windings 2, the current to which is controlled by current controller 3 via lines 4 and 5. A microcomputer 11 with ROM controls the current control devices in current controller 3 through servo preamplifier 25. Lines 4 and 5 of windings 2 are coupled to current sensing means 8 through current controller 3 via line 6. Current sensing means 8 is coupled to an analog to digital converter 9 via an analog input selector 10. The output of the analog to digital converter 9 is fed to microcomputer 11 with ROM which reacts to output by controlling current controller 3. The current sensing means 12 is coupled via line 7 to logic lever power supply 16. The current sensing means 12 is coupled to analog to digital converter 9 via the analog input selector 10.

Figure 5:
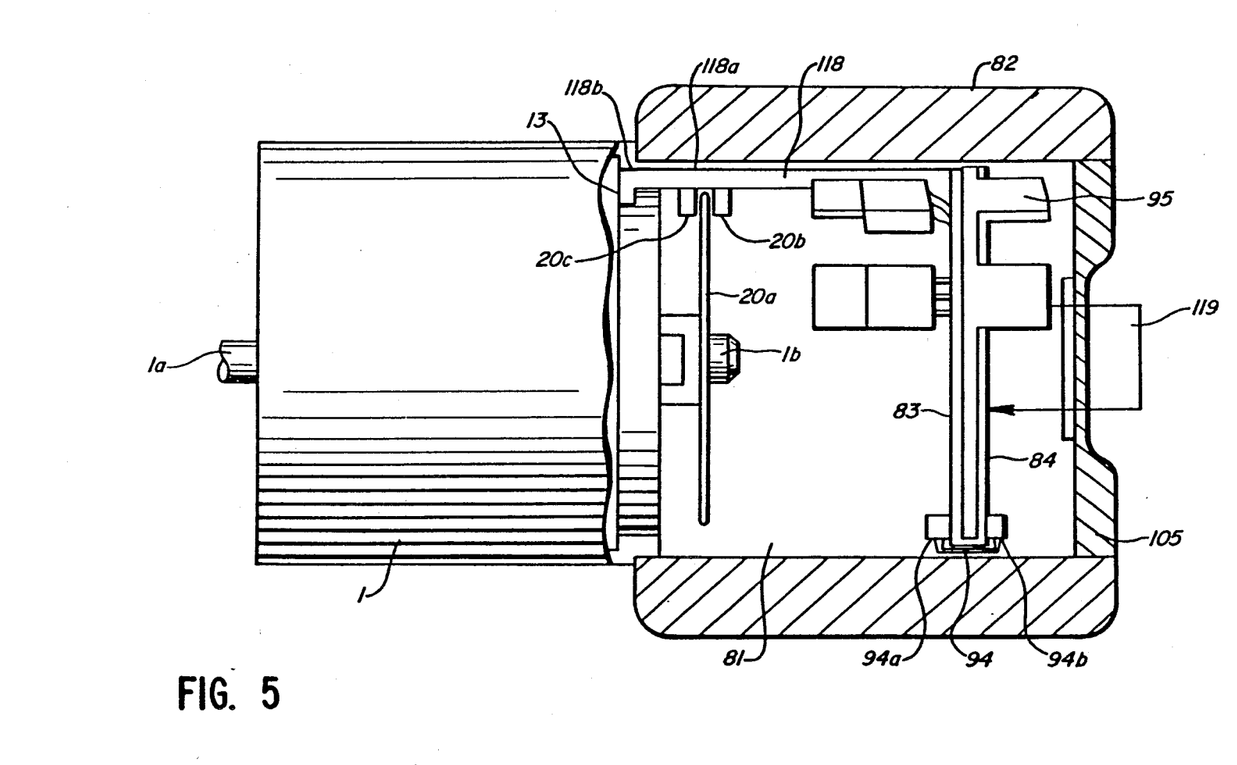
FIG. 5 is a cross-sectional view thereof, taken along the plane of the line 5—5 of FIG. 4.
Figure 10:
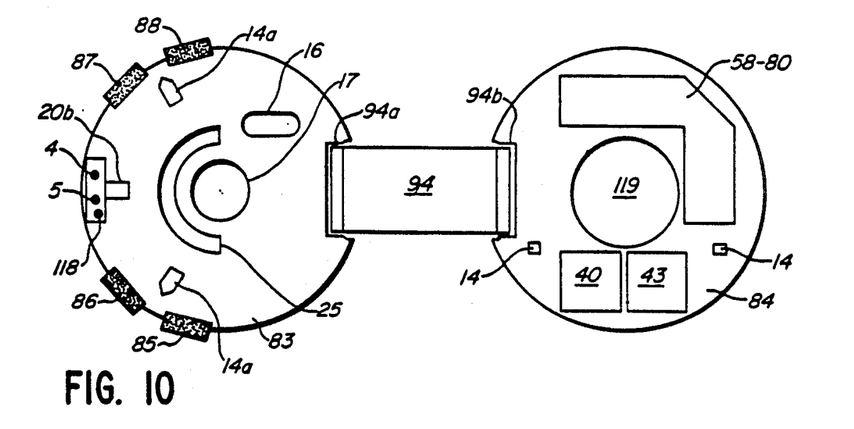
FIG. 10 is a top view of circuitry contained in FIG. 1 and constructed in accordance with the present invention.

The temperature of the servo motor and control circuitry are sensed by temperature sensors 13, 14, and 14a. Temperature sensor 13 is attached to motor 1 as illustrated in FIG. 5. Temperature sensor 13 is coupled to analog to digital converter 9 through analog input selector 10. Temperature sensors 14 and 14a are attached to hybrid substrates 84 and 83, respectively, as illustrated in FIG. 10. Temperature sensors 14 and 14a are coupled to analog to digital converter 9 through analog input selector 10. The outputs from temperature sensors 13, 14 and 14a are fed to the analog to digital converter 9 through the analog input selector 10. The output from analog to digital converter 9 is fed to the microcomputer 11, which reacts to output by controlling current controller 3. The microcomputer 11 controls outputs from sensors to analog to digital converter 9 via selector 10 which is controlled by way of bus 15.

The microcomputer 11 is connected to non volatile random access memory device 38 by way of bus 24. Memory device 38 stores the absolute limiting parameters such as maximum operating temperature and maximum operating current of motor 1. The operational limiting parameters such as desired operating temperature and desired operating current are determined by microcomputer 11 on a moment to moment basis in response to changes occuring within motor 1 and the outside operating environment. Memory device 38 is non volatile which allows for continued storage of limiting parameters during power outages.

As shown in FIGS. 1A-1B and described earlier in the text, microcomputer 11 is connected through an analog to digital converter 9 and an analog input selector 10 to temperature sensors 13, 14, and 14a and current sensing means 8 and 12. The purpose of this sensor network is to provide the microcomputer 11 with information concerning the internal and external operating conditions of the motor 1, driver circuit 39, and indexer circuit 43. Driver circuit 39 is defined on FIG. 1B, and indexer circuit 43 is defined within the dashed lines on FIG. 1B. The sensor network sends information to microcomputer 11 that microcomputer 11 uses to determine the range of operational limiting parameters under which motor 1 can safely operate.

A number of user-stipulated operating parameters such as user desired operating temperature and user desired operating current may be provided by a user via RS-232 interface 48 and microcomputer with ROM 44. If provided by user, the user-stipulated operating parameters are stored in memory device 38. Microcomputer 11 compares the information from the sensor network, with the absolute limiting parameters and the user-stipulated operating parameters to determine the operational limiting parameters which will govern the actual operating parameters of motor 1. The operational limiting parameters are determined by microcomputer 11 by an internal adaptive program. Microcomputer 11 controls the operation of motor 1 in a manner that keeps the operating parameters of motor 1 in a range governed by the operational limiting parameters.

Figure 14:
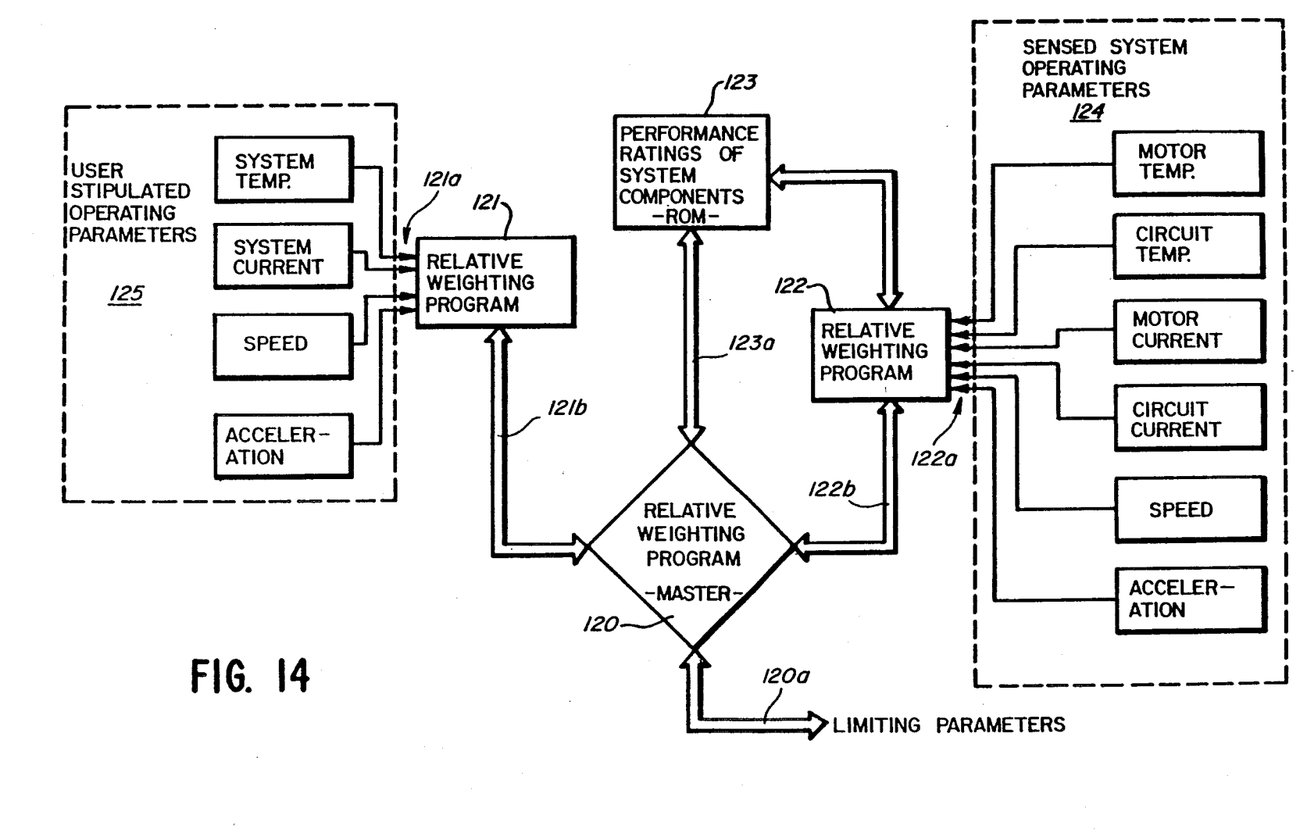
FIG. 14 is a block diagram of the decision making program in the driver circuit.

It is noted that the manner in which the operational limiting parameters are determined by microcomputer 11 is a limited form of artificial intelligence. As illustrated in FIG. 14, the sensed system operating parameters 124 are defined within the dashed lines on the right-hand side of FIG. 14 and user-stipulated operating parameters 125 are defined within the dashed lines on the left-hand side of FIG. 14. Relative weighting program 122 monitors sensed operating parameters 124 via lines 122a and compares sensed operating parameters 124 to the absolute limiting parameters of the system's components 123 to determine the relative value relationships between the parameters. The relative value relationships are fed via bus 122b to the master relative weighting program 120 by relative weighting program 122. The relative weighting program 121 monitors the user-stipulated operating parameters via lines 121a and determines the relative value relationships between the various parameters, and these relationships are then fed to master relative weighting program 120 via bus 121b. Master program 120 then takes the relative value relationships from program 122, the absolute limiting parameters from ROM 123 via bus 123a and the relative value relationships from program 121 and through a series of adaptive programs contained in master program 120, analyzes the values of all the parameters and computes an entirely new set of operational limiting parameters which are fed via bus 120a to microcomputer 11, which uses these parameters to control the operation of motor 1 on a moment by moment basis. This new set of operational limiting parameters is entirely determined by master program 120 based on all the information given to it by programs 121, 122 and 123. The new operational limiting parameters have not been preprogrammed into master program 120; they are a creation of program 120, and new operational limits are created on a moment by moment basis.

The current control devices in current controller 3 and logic level power supply 16 are powered by high voltage power supply 17. The inputs 19 to high voltage power supply 17 are coupled to a suitable alternating current supply. The logic level power supply 16 by way of positive voltage line 36 and common line 37 provides all power to each of the components in FIGS. 1A-1B with the exception of motor 1, windings 2 and current control devices in current controller 3.

The current controller 3 is connected to the servo preamplifier 25 via bus 26. The operation of servo preamplifier 25 is controlled by CIO controller and input-/output circuit 23, which is a servo amp controller, via bus 33 and digital to analog converter 32, which is coupled to CIO 23 via bus bus 34, thereby enabling microcomputer 11 to control current controller 3 via bus 24 through components 23, 25, and 32, respectively.

Figure 4:
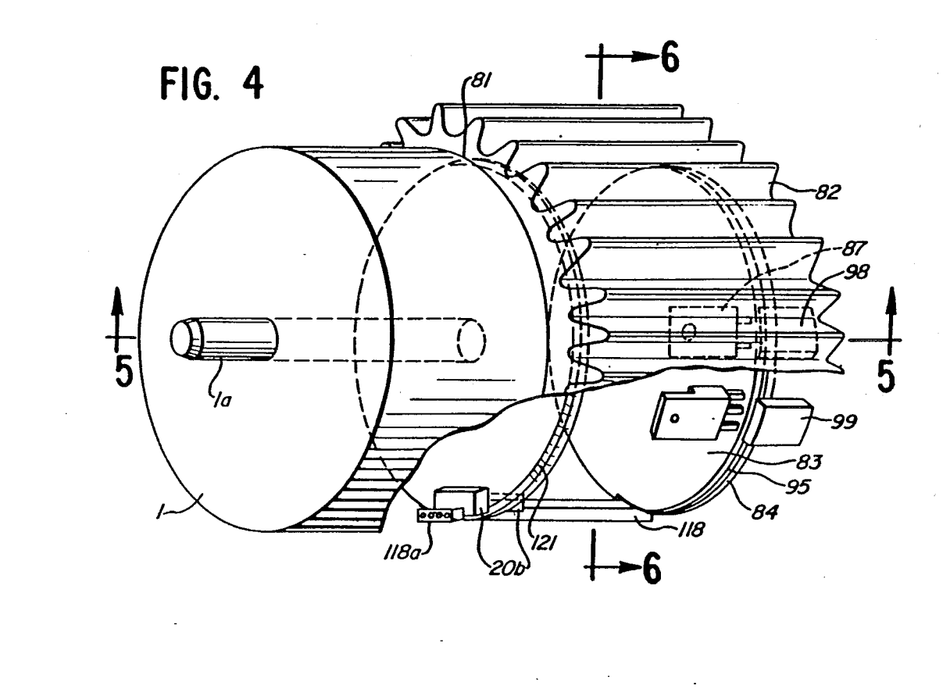
FIG. 4 is a perspective view, with portions broken away for clarity, of the servo motor system constructed in accordance with the principles of the present invention.

The position and velocity of motor 1 is sensed by the position/velocity sensor network 20, as defined FIG. 1B. In the illustrative embodiment, the position/velocity sensor comprises encoder disc 20a and emitter/detector sensor 20b, and encoder circuitry 21. Encoder disc 20a, which is carried on motor 1 in a manner described below, carries about its periphery indicia 121, as illustrated in FIG. 4, which are read by encoder circuitry 21 via sensor 20b in that the indicia 121 pass through the slot 20c of sensor 20b (See FIG. 5). The position and velocity data which are obtained by the encoder circuitry 21 is fed directly to CIO 23. CIO 23 uses the information on a moment to moment basis to control the flow of current into the windings of the motor in order to achieve the desired characteristics, such as position, speed, and direction, of a specific move.

It is noted that in the illustrative embodiment a position/velocity sensor, such as a resolver or tachometer, and sensor interface circuitry may be substituted for encoder disc 20a and sensor 20b and encoder interface circuitry 21, respectively. For example, a resolver sensor and resolver interface circuitry may be substituted for encoder disc 20a and sensor 20b and encoder interface circuitry 21, respectively. In this example, the position and velocity data which are obtained by the resolver interface circuitry via the resolver sensor is fed directly to CIO 23. The information is then used by the CIO 23 on a moment to moment basis to control the flow of current into the windings of the motor in order to achieve the desired characteristics of a specific move.

Information that signals the desired characteristics of a specific move are sent to CIO 23 via lines 50 and 51, by way of an external indexer via lines 56 and 57, respectively, or by indexer 43 via CIO 45 as described below. The information sent to CIO 23 is in the form of either a single move command, or a number of individual move pulses, whereby each pulse equals a fraction of the desired distance and the sum of the distance achieved by the individual move pulses equals the desired distance. In addition, data that determines the resolution of a move is sent to CIO 23 by microcomputer 11 via bus 24. The maximum resolution of a move is limited to the minimum change in degree angle that the encoder, or other position/velocity sensor used in the system, is capable of sensing. In a configuration in which an interface circuit (such as RS232 interface 48 in indexer 43 that would allow a programmer to communicate with microcomputer 11) is not present, the resolution of a move is determined by default by the program permanently stored in the internal memory of microcomputer 11. In the configuration in which indexer 43 (which will be descibed in more detail below) is present, microcomputer 44 could be programmed via lines 52 and 53, which are coupled to microcomputer 44 via RS232 interface 48 by way of lines 55 and 54, to signal variable resolutions. For example, during a specified move, the resolution could equal 1/200th of a revolution of motor 1. During a subsequent move, the resolution of could equal 1/4000th of a revolution, or some other fraction as determined by a system programmer. Microcomputer 44 would communicate changes in resolution to microcomputer 11 via bus 49, which in turn would communicate resolution to CIO 23 via bus 24.

The ability to program the resolution in a servo motor system is particularly important when the information that signals the desired characteristics of a specific move are sent to CIO 23 in the form of pulses. For example, a single pulse could be programmed to equal 1.8 degrees of a revolution or 0.9 degrees of a revolution. As a result, in many applications, a servo motor system with variable resolution could substantially simplify the programming of the system.

Crystal oscillator section 42 comprises crystal oscillators 42a and 42b. Crystal oscillator 42b is included in driver 39, and acts as the timing unit of driver 39. Crystal oscillator 42a is included in indexer 43, to be described below, and acts as the timing unit for indexer 43. Crystal oscillators 42a and 42b are connected together to allow all sections in FIG. 1 to operate synchronously.

Indexer circuitry 43 includes a microcomputer 44 with ROM, which controls the development and execution of an operating program; CIO controller and input-/output circuit 45, which is a programable command generating system and input/output interface, coupled to microcomputer 44 via bus 46; a non volatile random access memory 47, also coupled to microcomputer 44 via bus 46; an RS-232 interface 48 coupled to microcomputer 44 via lines 54 and 55; and crystal oscillator 42a coupled to microcomputer 44.

Interface 48 enables an external controller to communicate with the program in microcomputer 44. The memory device stores the operating program developed by the system programmer. Memory device 47 is non volatile which allows for continued storage of the operating program during power outages to the sytem. Using memory device 47, via the user interface program permanently stored in the internal memory of microcomputer 11, a system programmer can develop, test, store and alter a program on a step by step basis. Crystal oscillator 42a operates to time microcomputer 44.

As illustrated on the left hand side of FIG. 1, CIO 45 links microcomputer 44 via bus 46 with the external control inputs which include run, jog+, jog−, cw limit, ccw limit, E-stop, and internal outputs to an external controller which include mistrack, motor moving, motor shutdown and thermal shutdown. In addition, CIO 45 receives move commands from microcomputer 44 via bus 46, and in turn transmits step move pulses and direction move pulses to CIO 23 via lines 50 and 51.

All communication with the indexer 43 or the driver 39 is accomplished through the bank of optical isolators 58-80. These devices serve to isolate any external equipment from the high voltage present within the servo motor system. Furthermore, optical isolators 58-80 serve to isolate the servo motor system including driver 39 and indexer 43 from electrical noise and spurious signals that frequently occur outside of the servo motor system.

It is noted that certain features concerning the layout of the circuitry contained in FIGS. 1A-1B have been intentionally added to allow for substantual flexibility in the packaging of the various parts of the circuitry, without effecting the performance of the system. As discussed in an earlier part of the text, the information that signals the desired characteristics of a specific move are sent to CIO 23 of driver 39 via lines 50 and 51, via CIO 45, or external lines 56 and 57, respectively. This is an important feature in that external lines 56 and 57 allow the driver 39 to be provided apart from the indexer. Thus the driver 39 may be provided with just encoder 20. Further, the driver 39, encoder 20, and the indexer 43 can be provided as a unit.

It is preferred that all elements of driver 39 and indexer 43 of FIGS. 1A-1B, as defined within the dashed lines, respectively, be hybridized on at least one hybrid circuit. The hybridized circuit of driver 39 and indexer 43 comprises an electrically insulating, thermally conductive substrate, a metallization layer forming thick film and thin film electrical components, monolithic semiconductor devices, other hybridized devices and discrete components connected to the substrate.

Figure 2:
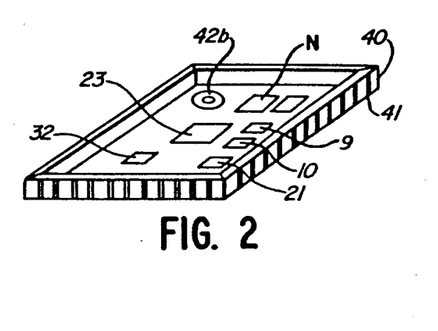
FIG. 2 is a perspective view of an indexer circuit constructed in accordance with the principles of the present invention.

The circuitry in FIGS. 1A-1B is hybridized on five hybrids 40, 43, 83, 84, and 118 as illustrated in FIGS. 2, 3, 4, and 10. Contained within the hybrid 40, as illustrated in FIG. 2, are sections 9, 10, 11, 21, 23, 32, 38, and 42b of FIGS. 1A-1B, which comprise the EMI/RF sensitive control circuitry of driver 39. The construction of hybrid 40 consists of combining sections 9, 10, 11, 21, 23, 32, 38 and 42b with thick film and thin film electrical components and conductors on an electrically insulating and thermally conductive substrate. Hybrid 40 is further constructed by mounting the substrate in a standard leadless chip carrier in which eleven of the fourty-four contact points 41 are provided on the outer rim of each of the four sides of the chip carrier, and sealing the circuitry in a compound, thereby shielding the hybrid from EMI/RF noise.

Figure 3:
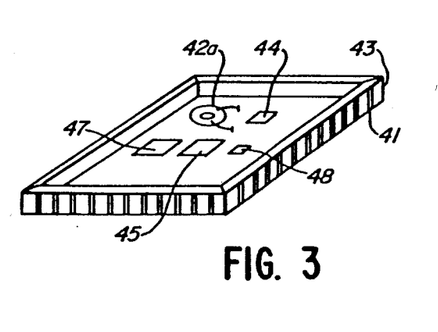
FIG. 3 is a perspective view of a part of the driver circuit constructed in accordance with the principles of the present invention.

The indexer circuitry is on hybrid 43, as illustrated in FIG. 3. Contained within hybrid 43 are parts 42a, 44, 45, 47, and 48 of FIGS. 1A-1B, and is constructed in the same manner as hybrid 40 described above.

Hybrids 83 and 84 are illustrated in FIG. 10. The substrates of hybrids 83 and 84 have the same conductive and insulating properties as described above, and are specificly formed in the shape of a disc with a notch on one end where connectors 94a and 94b, respectively, are connected. Contained within hybrid 84 are optical isolators 58-80 and temperature sensors 14 of FIGS. 1A-1B, hybrids 40 and 43 of FIGS. 2 and 3, respectively, and connector 119, all of which are combined with various thick film and thin film electrical components and conductors on disc shaped substrate as described above. Hybrid 84 is further constructed by sealing the circuitry in a compound, thereby shielding the hybrid from EMI/RF noise.

Hybrid 83 contains all parts of driver 39 of FIG. 1, except those parts contained in hybrid 40 described above. Contained within hybrid 83 are the parts of driver 39 which comprise the power generation and control sections of driver 39, including the current controller 3 which contains current control devices 85–88, the servo preamplifier 25, high voltage power supply 17, logic level power supply 16, current sense circuitry 12 and the temperature sensor circuitry 14a. Current control devices 85–88 are mounted to the outer rim of hybrid 83 in a circular pattern, the benefits of which will be discussed below. Hybrid 83 is constructed in the same manner as hybrid 84 described above. Hybrid 83 operates directly from an AC line, without the use of a transformer, and supplies logic level power to hybrid 84 via logic level power supply 16.

Referencing FIG. 4, it can be seen that there is a hybrid 118 perpendicular to hybrid 83. Contained within hybrid 118 are lines 4 and 5, encoder emitter/detector sensors 20b, bus 1a, as illustrated in FIGS. 1A–1B, and connector 118a. The traces encompassing lines 4 and 5 as well as additional traces carried on hybrid 118 are terminated at the driver end with metal pins that allow hybrid 118 to be soldered directly to hybrid 83. The traces encompassing lines 4–7 are terminated at the motor end of hybrid 118 with connector 118a that couples hybrid 118 directly to motor 1 via a connector 118b that is mounted in the rear end plate of motor 1, as illustrated in FIG. 5. Hybrid 118 is constructed in the same manner as hybrid 83 described above. It is noted that unlike conventional servo motor systems in which lines 4 and 5 are wires or cabling that radiate EMI/RF noise, lines 4 and 5 on hybrid 118 are conductive traces formed in the hybridization process by a heavy metalization layer that is encased in an EMI suppressive coupound and terminated at the motor end in a four pin female connector. Of additional importance, is that hybrid 118 is carried in housing 81 which is directly attached to motor 1, thereby completely sheilding all external circuitry from the EMI/RF noise radiated by lines 4–7. Further, by replacing the wires or cabling between motor 1 and hybrid 83 with hybrid 118 with fixed connectors, an efficient assembly procedure is achieved whereby any miswiring that can occur in conventional servo motor systems is eliminated.

Figures 6, 7, 8, 9:
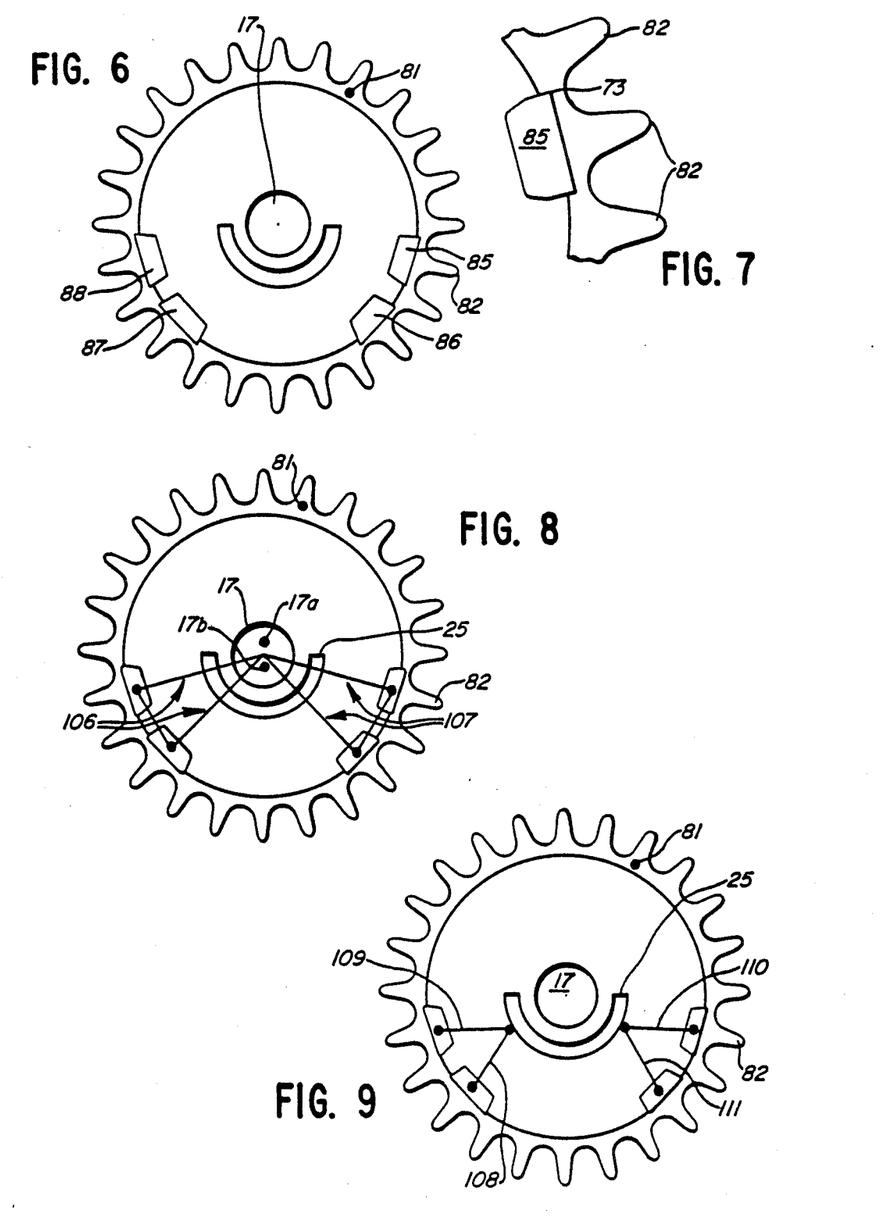
FIG. 6 is a cross-sectional view thereof, taken along the plane of the line 6—6 of FIG. 4.
FIG. 7 is an enlarged view of a portion of FIG. 6.
FIG. 8 is similar to FIG. 6 but shows critical paths.
FIG. 9 is similar to FIG. 8 but shows additional critical paths.

A further function of hybrid 118 is to accurately position the emitter/detecter sensor 20b in relation to the encoder disc 120 as shown in FIG. 7. The encoder disc 20a is carried by shaft 1b of motor 1, as illustrated in FIG. 5, and is keyed to prevent slippage due to vibration, and rotates about shaft 1b. Encoder disc 20a carries about its periphery indicia 121, as illustrated in FIG. 4, which are read by encoder circuitry 21 via sensor 20b. Sensing of indicia 121 requires that accurate placement of sensor 20b be maintained during the operation of the motor. By mounting sensor 20b on hybrid 118, and securely attaching hybrid 118 to the inner wall of housing 81, and mounting housing 81 to the back of motor 1, the position of sensor 20b can be accurately made during assembly and maintained during the operating of the motor.

It is noted that hybridization of the circuits shown in FIG. 1 allows for the trimming of the resistors, capacitors, conductors and inductors in the various metalization layers, via a laser beam, to achieve exact values, thereby creating a very accurate circuit whose exact performance specifications are known. This functional trimming of the metallization layers to achieve a more accurate circuit is only possible in a hybridized circuit, and allows for motor accuracies and speeds that are not possible with conventional drivers and indexers constructed with printed circuit board techniques. For example, because the circuitry in FIG. 1 is hybridized and carried integrally with motor 1, and assuming that the operating specifications of motor 1 and position/velocity sensor 20 and the operating conditions in the work environment would allow for very fine resolutions and very high speeds, servo motor 1 could operate at resolutions up to 50,000 steps per revolution or speeds up to 10,000 RPM, compared to resolutions and speeds of 4,000 and 3000 RPM, respectively, of conventional servo motor systems.

The system is extremely compact and mechanically stable as a result of hybridizing the circuitry and placing the circuitry in a sealed enclosure on the back side of the motor 1. The hybridized circuit is potted in place to effectively bind the hybrid substrates and current control devices of current controller 3 to the heat sinking system, discussed in detail below, thereby providing significant heat dissipation capabilities and mechanical stability of the system. Thus the components should not become loose as a result of vibration because they have been permanently potted in place. This is particularly significant when using the system in military and aerospace applications which produce significant vibrations. By potting the circuitry in place the vibrations of the environment and or the motor will not operate to loosen the circuitry.

The mechanical structure of a servo motor system in accordance with the principles of the present invention is illustrated in FIGS. 4 and 5. Referring to FIG. 4, it is seen that motor 1 includes operating shaft 1a, the movement of which is controlled in accordance with the circuitry described above. At the rear of motor 1 there is provided a housing 81 which includes a number of radially extending fins 82 spaced circumferentially about the cylindrical housing. Fins 82 operate as the external part of heat sinking system, which will be described in detail below, for components that are enclosed within the housing. As further illustrated in FIG. 4, within housing 81 there is enclosed hybrids 83 and 84, that are mounted within the volume defined by the inner wall 81a of housing 81. The hybrids 83 and 84 are comprised of electrically insulating and thermally conductive substrates shaped in the form of a disc, metallization layers forming thick film and thin film components, monolithic semiconductors, other hybridized circuits and discrete components connected to the substrates. Mounted on hybrid 83 are current control devices 85–88 which are utilized by lines 4 and 5. Each of the current control devices is fitted into a recess 93 as shown in FIG. 7 and defined by the inside wall 81a of the metal housing 81 and fins 82, with the housing 81 and fins 82 operating as a heat sink for the respective current control device.

The hybrids 83 and 84, which contain the circuitry shown in FIGS. 1A–1B, are connected together by an electrical cable 94, as shown in FIG. 10, via connector 94a and 94b, and then folded and attached to a circular heat sink 95 in the manner described below.

Figures 11, 12, 13:
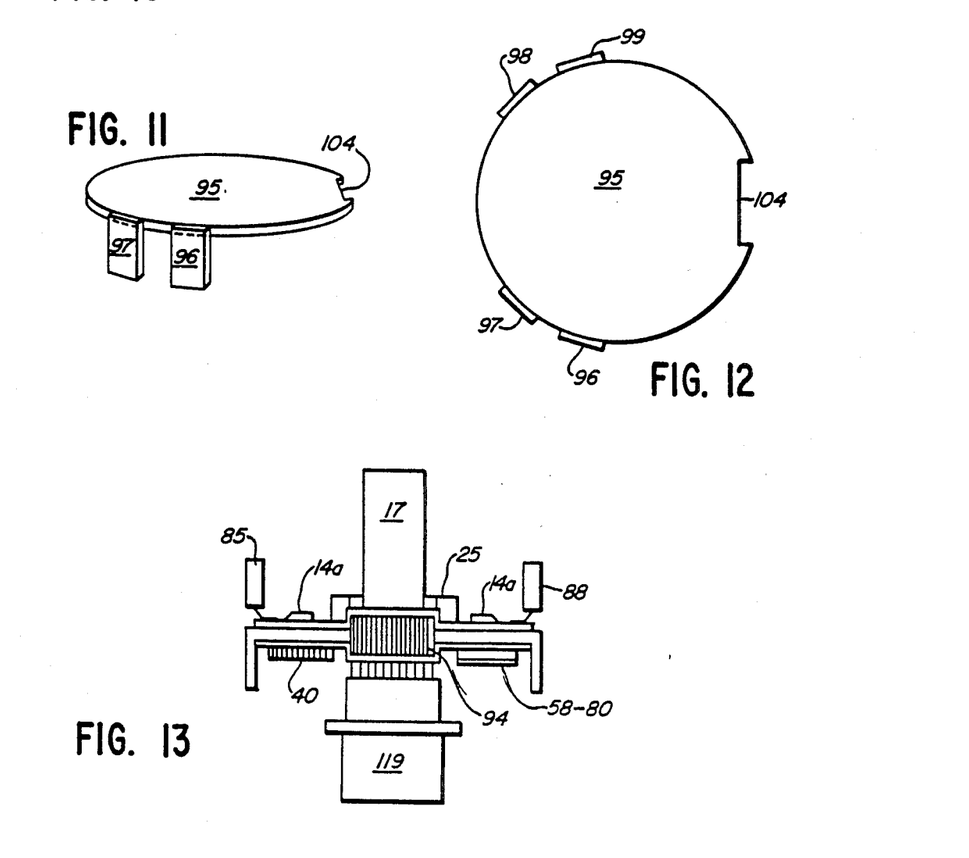
FIG. 11 is a perspective view of a heat sink constructed in accordance with the present invention.
FIG. 12 is a top view of FIG. 11.
FIG. 13 is a side elevational view of FIG. 10 attached to FIG. 11 in accordance with the present invention.

Heat sink 95, as illustrated in FIGS. 11 and 12, is the interior part of a heat sinking system for the components that are enclosed within the inside wall 81a of housing 81, and acts as a thermal path to allow heat to travel from the individual components on the thermal conductive substrates of hybrids 83 and 84 out to housing 81 and the cooling fins 82. Heat sink 95 comprises a metal plate formed in the shape of a disc, a notch 104 at one end of the plate, metal tabs 96–99 attached to the outer rim of the plate, whereby tabs 96–97 are attached to the rim of the plate on one side of notch 104, and tabs 98–99 are attached to the rim of the plate opposite tabs 96–97. The spacing between each of the tabs, such as the space between tab 96 and tab 97, is such that each tab can be securely fitted into one of the recesses occupied by current control devices 85 through 88, as illustrated in FIGS. 6 and 7, during final assembly. For example, tab 96 occupies the same recess as current control device 85, tab 97 the same recess as current control device 86.

As illustrated in FIG. 13, the bottom of hybrid 13 is firmly attached to the top of heat sink 95, whereby current control devices 85–88 connected to the top surface of hybrid 83 are vertically aligned with tabs 96–99 of FIG. 12, respectively, and air gaps between substrate of hybrid 83 and surface of heat sink 95 are minimized. Hybrid 84, which is connected to hybrid 83 by way of cable 94, is folded in a manner whereby cable 94 fits into notch 104 of heat sink 94 and the bottom of hybrid 84 is firmly attached to the bottom surface of heat sink 95. By firmly attaching substrate of hybrid 84 to the bottom surface of heat sink 95, air gaps between the hybrid and the heat sink are minimized. Assembly in this manner will result in power supply 17 being vertically aligned with connector 119.

Referring to FIG. 13, it can be seen that by assembling hybrid substrate 83 and 84 to heat sink 95 in the manner described above, a very efficient package has been created. The form of the package allows for efficient heat dissipation of hybrids 83 and 84. In addition, the package allows automatic assembly and testing of the unit prior to final assembly. Further, securing the unit in housing 81 is accomplished by sliding the unit into housing 81 whereby current control devices 85–88 and tabs 96–99, respectively, are fitted into the appropriate recesses, such as recess 93, of housing 81, and potting the unit permanently in place with a thermally conductive compound. No screws are required to attach the unit to housing 81. Rear cover plate 105, as shown in FIG. 5, is fitted into place immediately after potting. After curing of the potting compound, the components will be securely held in place by the potting compound. The only movement inside the hybrid block will be the very slight thermal expansion and contraction movements of the semiconductors at their solder junctions.

As illustrated in FIG. 8, the source of motor power on hybrid 83 are power recepticles 17a and 17b. Servo preamplifier 25 is located between power recepticles 17a and 17b and current control devices 85–88. As illustrated in FIGS. 6–10, it is preferred that the current control devices 85–88 be located in a circular pattern surrounding the power recepticles 17a and 17b and servo preamplifier 25. FIG. 8 shows the critical paths 106 and 107 of current between power recepticles 17a and 17b and current control devices 85–88. It is preferred that both critical paths 106 and 107 be three inches or less in length and be equal in length. Furthermore, FIG. 9 shows a second series of critical lengths. It is preferred that the leads 108–111 between the servo preamplifier 25 and the current control devices 85–88 be less than one inch in length and be equal in length. The arrangement of the hybrids' components as described above results in a circuit that is capable of much higher speeds and resolutions than possible with a conventional driver that is constructed using printed circuit board techniques. Short and similar lead lengths are a critical part of eliminating the parasitic oscillations that can occur in longer or uneven leads. These oscillations can severely restrict the degree of control that servo preamplifier 25 has over current controller 3 and current control devices 85–88.

It can be seen from the illustrated embodiment that a servo motor system has been provided in which the driver is located on the motor itself, and includes all circuitry necessary for the operation of the motor including current controller with current control devices, servo preamplifier, translation circuitry, translator control circuitry, temperature and current acquisition circuitry, logic level and high voltage power supply, and optical isolation units. This enables the total package size of the servo motor/driver combination to be substantially reduced when compared to the prior art. The reduction in size is significant to an end user wanting to reduce the size and weight of a product, thereby improving a product's manufacturing cost, market appeal and performance. Further, significant weight reductions have profound implications in the aerospace and aviation industries where high resolution, high power servo motor systems have heretofore been considered an unacceptable positioning system for airplane or rocket avionics.

By removing bulky transformers, capacitors, numerous heat sinks, as well as numerous other power supply, connection and support components from the system and packaging the entire drive system in a single potted circuit block which is enclosed in a unitary housing with the motor, there are many benefits for the user beyond weight reduction. For example, there is provided a significantly safer working environment. This is because there is no possible way for a human or an outside piece of machinery to come into contact with the drive electronics through direct contact with the drive circuitry or with the high voltage traces connecting the drive circuitry to the motor. Since the drive circuitry is in a hermetically sealed block which is in turn sealed inside of the motor enclosure, there is no chance for any circuit short, or malfunction, to cause a spark nor is there a way for any outside agent to effect the circuitry. This enables the use of the system in an extremely hostile environment, such as flammable, corrosive or humid environments.

By placing the microcomputer based hybrid driver system in direct contact with the motor's windings, a significant number of operating improvements are achieved. Because there is no cable connecting the driver to the motor and since the conductor length between the motor windings and drive circuitry have been reduced, preferably to less than two inches, and in addition have been well shielded both internally and through the motor shell itself, as well as having very tightly defined inductance values achieved through laser trimming of the conductors, the microcomputer which is contained within the drive circuitry package can monitor very small changes in the motor coil's inductance and resistance. The microcomputer can also monitor changes in the temperature of the motor's windings and shell, as well as changes in temperature of the circuitry contained in the hybrid block, the temperature of the heat sink and the external temperature, to make changes in the control patterns sent to the current controller to compensate for variations in the motors environment and load requirements. This allows the motor to safely run more accurately, with higher resolution and at faster speeds than in prior art systems.

Further, by monitoring motor changes, the internal microcomputer can be programmed to optimize the current flowing to the motor winding in order to allow the motor to be able to deliver its maximum potential torque at all times. This is a real torque value, which is not a calculated or maximum value as stated by the original motor manufacturer, but one that is constantly redetermined by the microcomputer under actual operating conditions. This torque value will frequently be higher than the manufacturer's rated running torque. With proper cooling to the motor, the drive circuitry of the present invention is capable of delivering substantial increases in torque over prior art systems.

By using the heat dissipating system of the present invention, the heat dissipation is greatly improved, allowing higher power circuitry to be used in the system. By mounting the driver circuitry on thermally conductive substrates which are then attached to the heat sink, and attaching some of the discrete semiconductors on the substrate directly to the heat sink, and encasing the substrate, components and heat sink in a unified block of thermally conductive potting compound, it is possible to package a driver capable of relatively high output power in a package greatly smaller than the current state of the art low power devices.

In hybridization, resistors, inductors, capacitors and conductors in a circuit are formed directly onto the substrate material. Further, the manufacturing process allows for the functional testing and trimming of the components values for optimal circuit response. By eliminating all of the variables of the manufacturing process, such as variable component values, it is possible to obtain a very accurate driver circuit that would allow the microcomputer to monitor very small changes in the operation of the circuitry within the system and directly attribute these changes to specific outside influences. The microcomputer can then make corrections and or compensations for them. This level of control of motor and driver responses is only possible as a result of the hybridization of the motor/driver circuit.

Very short conductor lengths, as well as optimal trace inductances are possible in the hybrid driver system of the present invention. This is important at the high operating speeds found in high resolution drive circuitry where errors in frequency and phase characteristics, as well as parasitic oscillations caused by mismatched inductors, can have a detrimental effect on the absolute positioning accuracy of the servo motor system. By hybridizing all drive circuitry thereby removing all the variables in the circuit created by the use of subcomponents mounted on printed circuit boards, and by removing error inducing cabling and by constantly monitoring the actual performance of the motor and changing the drive parameters accordingly, the absolute positioning accuracy of the motor is greatly improved.

By including an indexer and position/velocity sensor in hybridized form in the same enclosure as a hybridized driver and locating the enclosure on the motor itself, a completely self contained closed loop servo motor positioning system is provided that has notable improvements in performance and flexibility over conventional servo motor systems, and is substantially light in weight and small in size when compared with conventional servo motor systems.

Although an illustrative embodiment of the invention has been shown and described, it is to be understood that various modifications and substitutions may be made by those skilled in the art without departing from the novel spirit and scope of the present invention.

What is claimed is:

1. An electrical motor system which comprises:
   a DC motor;
   driver means for positioning the motor, controlling the speed of the motor, controlling the direction of the motor, and controlling the current delivered to the windings in the motor;
   memory means;
   means for sensing operating parameters of the system on a moment by moment basis and for providing data to said memory means;
   means for providing a plurality of user-stipulated operating parameters during use of the motor system;
   means for sensing a plurality of user-stipulated operating parameters on a moment by moment basis and for providing data to said memory means;
   said memory means containing limiting parameters, sensed operating parameters and user-stipulated operating parameters, and a set of programs for determining the relationship between the parameters;
   computing means for using the limiting parameters, operating parameters, user-stipulated operating parameters via the set of programs to create, on a moment by moment basis, a new set of operational limiting parameters; and
   means for transmitting said new set of operational limiting parameters to said driving means on a moment by moment basis to control the position of the motor, the speed of the motor, the direction of the motor, and the current delivered to the motor windings.

2. An electrical motor system as defined by claim 1, including driver control means for enabling the user to control the degree of position change, the speed of position change and the acceleration of the position change.

3. An electrical motor system as defined by claim 1, including a common housing for said driver means and sensing means, said housing comprising a metallic enclosure shielding against electrical noise; and means connecting said housing to the back of said motor to form a compact, unitary device.

4. An electrical motor system as defined by claim 1, in which said means for sensing operating parameters includes encoder means for sensing the position and velocity of the motor and for providing an output signal responsive thereto.

5. An electrical motor system as defined in claim 4, including a common enclosure for housing said driver means and encoder means to increase the accuracy of the positioning of the motor.

6. An electrical motor system as defined in claim 1, incuding a common housing for said driver means, sensing means, and computing means, said housing comprising a metallic enclosure shielding against electrical noise; and means connecting said housing to the back of said motor to form a compact, unitary device.

7. An electrical motor system as defined in claim 1, said driver means being miniaturized using a combination of hybrid circuits, monolithic semiconductor devices and discrete components connected to at least one substrate.

8. The method of operating an electrical motor, which comprises the steps of:
   providing a DC motor;
   providing driver means for positioning the motor, controlling the speed of the motor, controlling the direction of the motor, and controlling the current delivered to the motor windings;
   sensing operating parameters of the system on a moment by moment basis;
   providing data relating to said operating parameters to memory means;
   during use of the motor system, providing a plurality of user-stipulated operating parameters;
   sensing said user-stipulated operating parameters on a moment by moment basis;
   providing data relating to said user-stipulated operating parameters to said memory means;
   said memory means including a set of programs for determining the relationship between the parameters;
   using the limiting parameters, sensed operating parameters and user-stipulated operating parameters via the set of programs to create, on a moment by moment basis, a new set of operational limiting parameters;
   transmitting said new set of operational limiting parameters to said driver means on a moment by moment basis to control the position of the motor, the speed of the motor, the direction of the motor, and the current delivered to the motor windings.

9. A method as defined by claim 8, including the steps of controlling the degree of position change, the speed of position change, the acceleration of the position change and the direction of the position change.

* * * * *